(12) United States Patent
Boudrie et al.

(10) Patent No.: US 6,832,330 B1
(45) Date of Patent: Dec. 14, 2004

(54) REVERSIBLE MIRRORED RESTORE OF AN ENTERPRISE LEVEL PRIMARY DISK

(75) Inventors: Robert A Boudrie, Ashland, MA (US); Thomas L Dings, Hopkinton, MA (US)

(73) Assignee: EMC Corporation, Hopkinton, MA (US)

(*) Notice: Subject to any disclaimer, the term of this patent is extended or adjusted under 35 U.S.C. 154(b) by 528 days.

(21) Appl. No.: 09/945,657

(22) Filed: Sep. 5, 2001

(51) Int. Cl.[7] .............................................. G06F 11/00
(52) U.S. Cl. ........................ 714/6; 714/5; 707/202
(58) Field of Search ................... 714/6, 5; 707/202, 707/201; 711/114

(56) References Cited

U.S. PATENT DOCUMENTS

| | | | |
|---|---|---|---|
| 5,790,773 A | * | 8/1998 | DeKoning et al. ............ 714/6 |
| 6,260,124 B1 | * | 7/2001 | Crockett et al. ............ 711/162 |
| 6,401,215 B1 | * | 6/2002 | Maddalozzo et al. .......... 714/6 |
| 6,480,970 B1 | * | 11/2002 | DeKoning et al. ............. 714/6 |
| 6,542,962 B2 | * | 4/2003 | Kodama et al. ............ 711/114 |
| 6,578,120 B1 | * | 6/2003 | Crockett et al. ............ 711/162 |
| 6,611,850 B1 | * | 8/2003 | Shen .......................... 707/204 |
| 6,625,748 B1 | * | 9/2003 | Tanaka et al. ................. 714/6 |
| 6,718,352 B1 | * | 4/2004 | Dang et al. ................. 707/205 |

* cited by examiner

Primary Examiner—Robert Beausoliel
Assistant Examiner—Yolanda L Wilson
(74) Attorney, Agent, or Firm—Daly, Crowley & Mofford, LLP

(57) ABSTRACT

When performing mirrored disk restores, including both disk level mirrored restores and file level mirrored restores, rather than first restore data to a mirror disk and later move that data to the primary disk, the data on the primary disk is first copied to the mirror disk, and thereafter, the data is restored from the backup storage device to the primary disk, independent of the mirror disk.

22 Claims, 6 Drawing Sheets

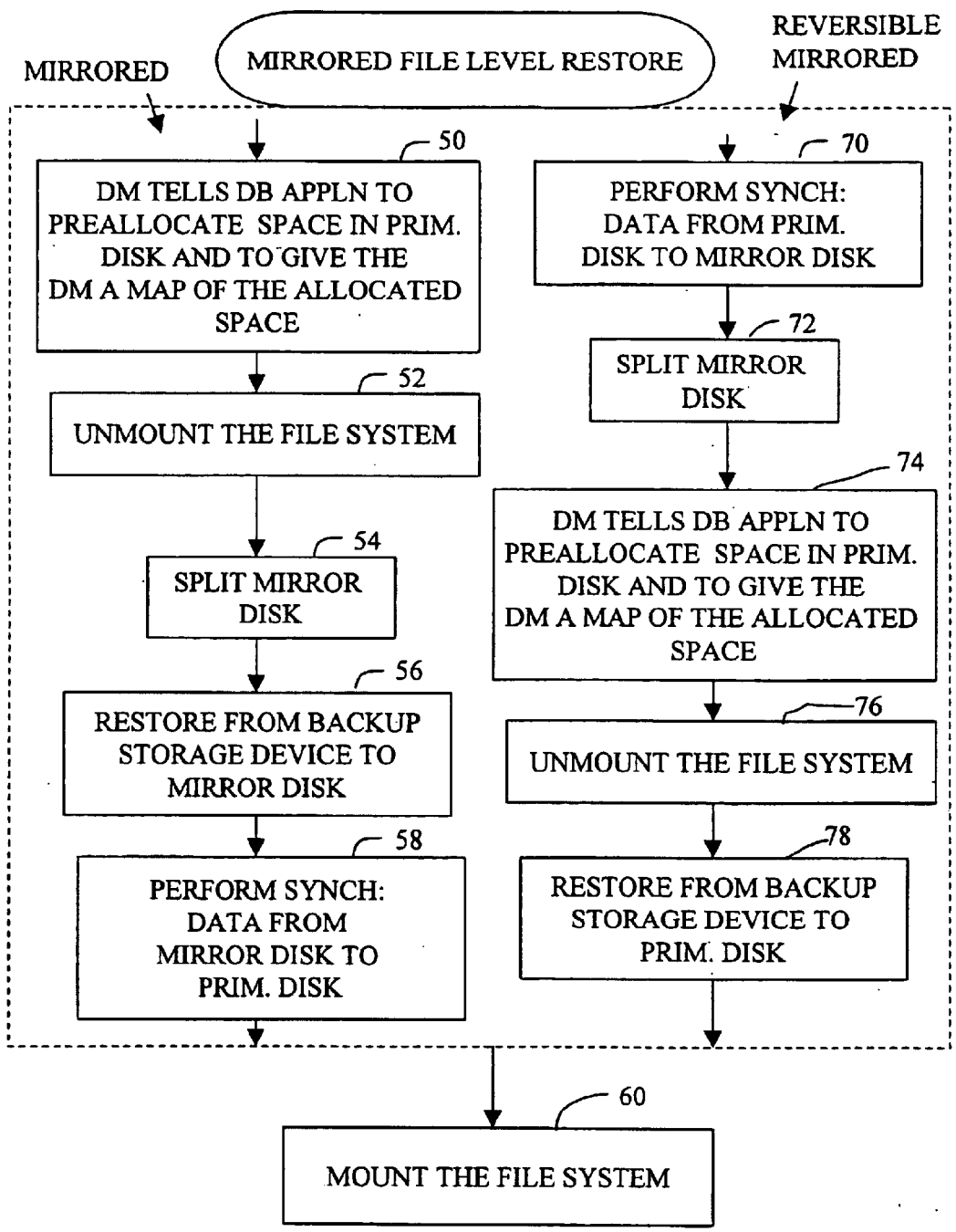

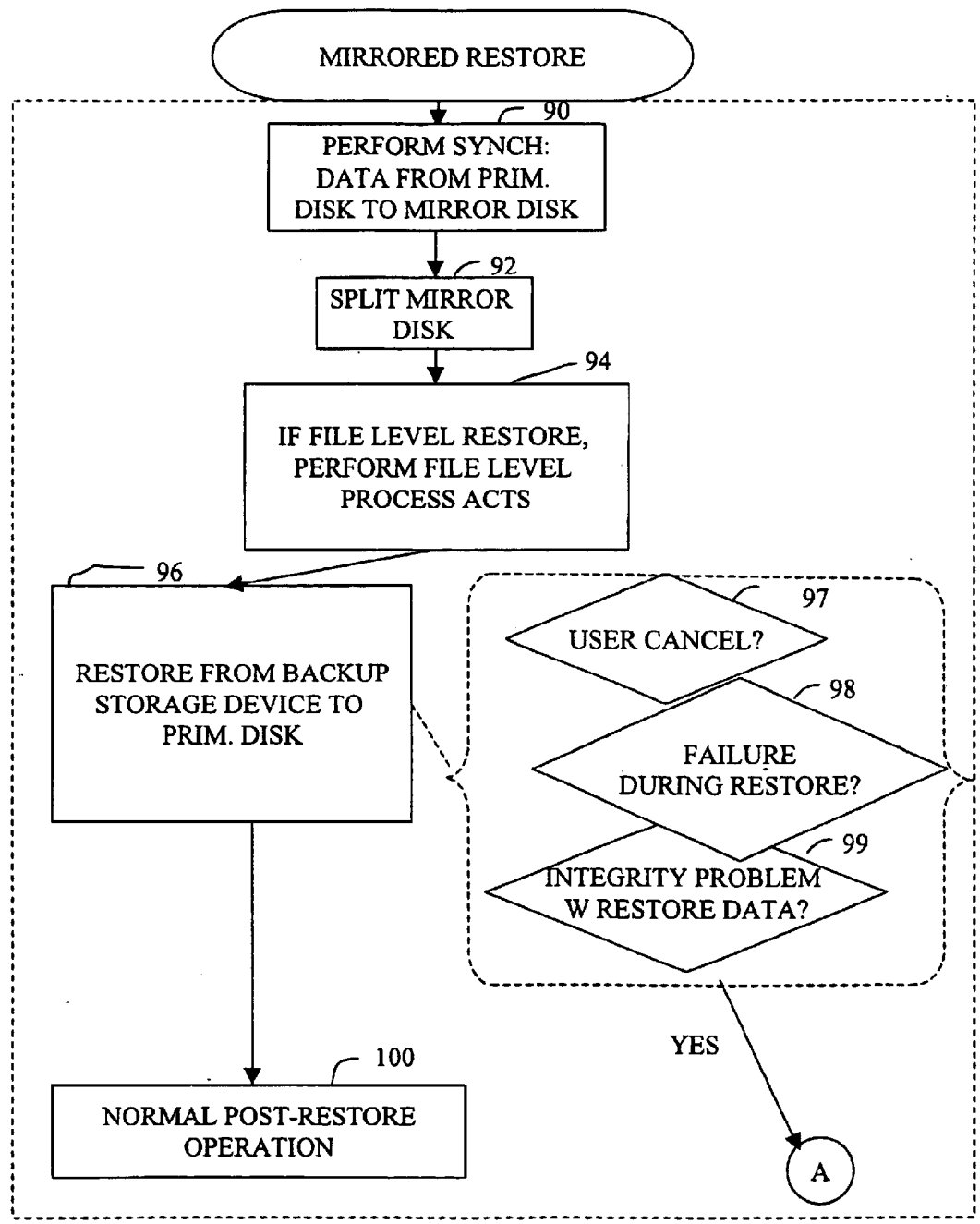

REVERSIBLE MIRRORED RESTORE OF AN ENTERPRISE LEVEL PRIMARY DISK

BACKGROUND OF THE INVENTION

1. Copyright Notice

This patent document contains information subject to copyright protection. The copyright owner has no objection to the facsimile reproduction by anyone of the patent document or the patent, as it appears in the U.S. Patent and Trademark Office files or records but otherwise reserves all copyright rights whatsoever.

2. Field of the Invention

The present invention, in certain respects, relates to enterprise storage systems and backup and recovery processes. In other respects, the present invention relates to restoring data from a backup storage device and to reversing a restore of data from a backup storage device to a primary disk.

3. Description of Background Information

Enterprise Storage Systems are utilized to store data for enterprise level applications, and thus play a critical role in many business environments. For example, a company may use an enterprise storage system to migrate its disparate and separately located data centers to a new central location. As another example, an enterprise storage system can facilitate the creation of an infrastructure to allow an internet service provider (ISP) to store, manage, and deliver rich media content, to accommodate backup and restore operations in the event of site failures or disasters, and to allow the ISP to streamline its management of hardware and software platforms and applications.

The data used by such business environments is mission-critical, and thus must be readily and continuously accessible by a host system. Such mission-critical data needs to be protected and continuously available even when a disk fails. A mirror disk (or volume) provides redundancy for a primary disk (or volume). Such mirroring occurs with a standard RAID configuration. Another mirror may be provided for data protection in addition to or instead of a standard RAID type mirror. Such a mirror may alternatively be provided in a Symmetrix™ storage unit along with the primary disk. In this case, the mirror is referred to as a business continuance volume (BCV). Such a mirror may be on one Symmetrix™ connected by a high speed data link to another Symmetrix™ that holds the primary disk. In this case, the mirror is called a Symmetrix Remote Data Facility (SRDF)™ volume. A volume is a storage entity that might correspond to a portion of a hard disk or a group of hard disks within a given enterprise storage platform such as the Symmetrix™ storage platform.

Enterprise storage systems such as those described above perform data backup processes and restore processes. Disk level backups and restores involve the backing up or the restoring of a raw "image" of the entire disk, while file-level backups and restores require file mapping, a process by which data that is located at various physical locations on a disk is converted to data logical order before it is sent to the backup storage devices. In other words, all pieces of a given file are put in their proper contiguous form for storage on the backup storage device (typically, one or more tape drives within a tape library unit). In addition, a file level restore requires a "pre-allocation" step in which a file of the correct size, but with null data, is created to provide a destination which may be mapped for restore.

Data may be restored from a backup storage device with mirroring (a mirrored restore). With a mirrored restore, data is typically first read from the backup storage device and stored onto a mirror disk and later moved from the mirror disk to the primary disk for use by the host system.

SUMMARY OF THE INVENTION

The present invention is provided, generally, to improve upon disk restore and backup processes, and, more specifically, to provide added flexibility and benefits when performing mirrored disk restores, including both disk level mirrored restores and file level mirrored restores. Rather than first restore data to a mirror disk and later move that data to the primary disk, the data on the primary disk is first copied to the mirror disk, and thereafter, the data is restored from the backup storage device to the primary disk, independent of the mirror disk.

This approach provides a copy of the destination location, as it existed prior to the restore operation. There are situations in which the user may want to reverse the effects of the restore, and bring the system back to the "pre-restore" state. One such situation exists when the user decides the restored data is less useful than the data present before the restore. Another such situation exists when a restore is unable to be completed (because, for example, a tape is damaged), in which case the restore system should leave the production system in the same state as that which existed prior to initiating the restore operation.

Other features, objects, and advantages of the present invention may be provided in addition to or instead of the above exemplary description of the invention, and such different aspects of the invention can be gleaned from other portions of the description herein.

BRIEF DESCRIPTION OF THE DRAWINGS

The present invention is further described in the detailed description which follows, by reference to the noted drawings by way of non-limiting exemplary embodiments, in which like reference numerals represent similar parts throughout the several views of the drawings, and wherein:

FIG. 3 is a flow chart of two compared approaches to performing a mirrored file-level restore.

FIGS. 4A and 4B represent a flow chart of a mirrored restore process, including acts for reversing a restore.

DETAILED DESCRIPTION

Figure 1A:
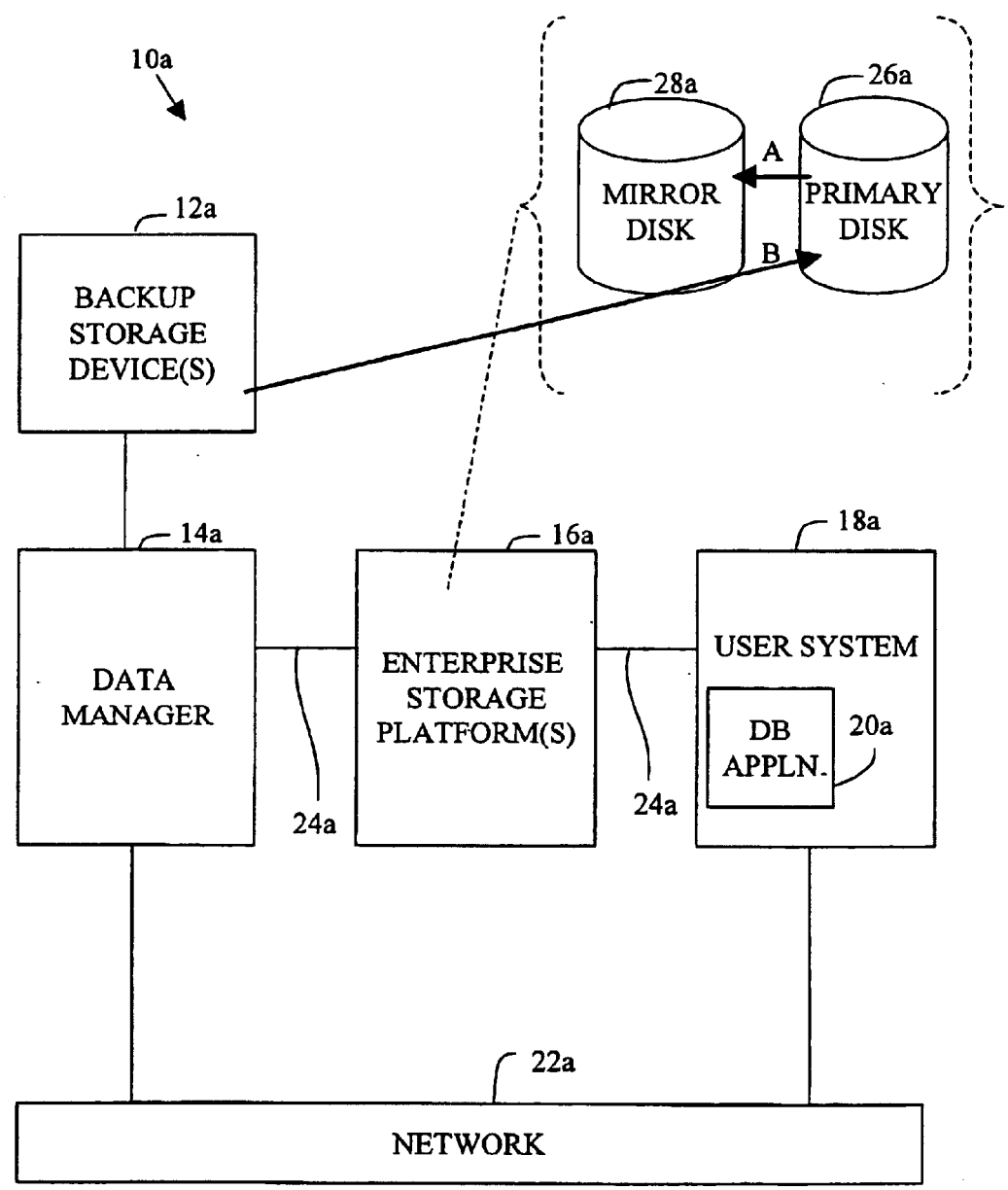
FIGS. 1A and 1B are simplified high-level block diagrams of illustrated embodiments of an enterprise storage system performing a mirrored restore.

Referring now to the drawings in more detail, FIG. 1A illustrates one embodiment of an enterprise storage system 10a involved in restoring data from one or more backup storage devices 12a to a primary disk 26a for direct use by a database application 20a. In the illustrated system, a backup storage device (or plural backup storage devices) 12a is connected to a data manager 14a. Data manager 14a is connected, in tandem, to an enterprise storage platform (or plural collocated or remote enterprise storage platforms) 16a and to a user system (a host system) 18a. In the illustrated system, each of data manager 14a and user system 18a is linked via a network 22a, and is connected directly to at least one local enterprise storage platform 16a via one or more channels (e.g., SCSI channels) 24a.

Figure 1B:
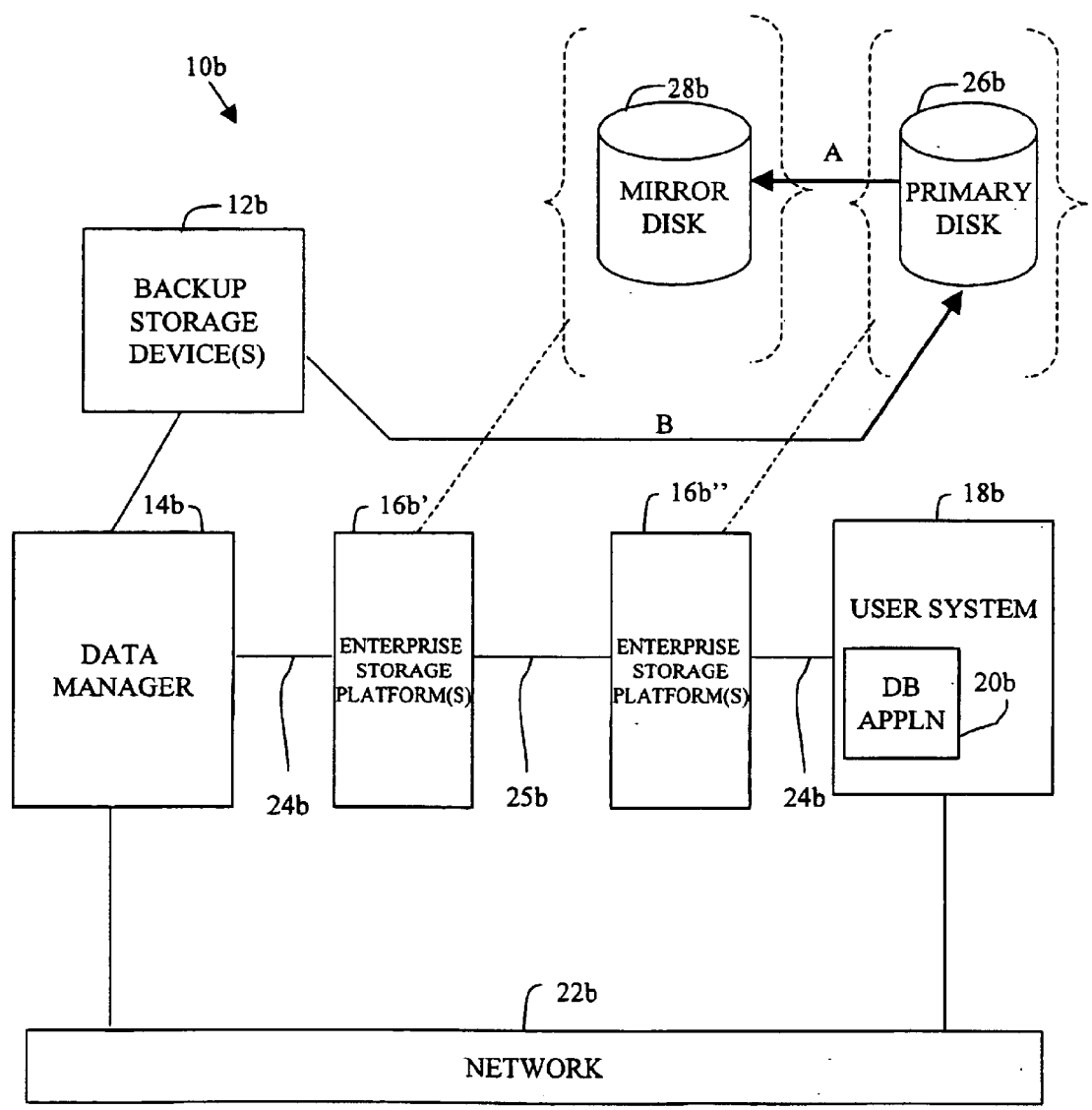

FIG. 1B illustrates another embodiment of an enterprise storage system 10b involved in restoring data from one or more backup storage devices 12b to a primary disk 26b for direct use by a database application 20b. In the illustrated system, a backup storage device (or plural backup storage devices) 12b is connected to a data manager 14b. Data manager 14b is connected, in tandem, to enterprise storage platforms 16b', 16b" and to a user system (a host system) 18b. In the illustrated system, each of data manager 14b and user system 18b is linked via a network 22b, and is connected directly to at least one local enterprise storage platform 16b', 16b" via one or more channels (e.g., SCSI channels) 24b. The illustrated enterprise storage platforms of FIG. 1B comprise one platform 16b' (on the left) that comprises mirror disk 28 and another platform 16b" (on the right) that comprises primary disk 26b. This pair of platforms 16b is connected by a high speed data link (e.g., a fiber optic link).

Backup storage device(s) 12a, 12b may comprise, e.g., a tape library unit. Data manager 14a, 14b may comprise, e.g., a Sun™ microstation running EDM™ software (EMC data manager software). Enterprise storage platform 16a, 16b may, e.g., comprise one or more plural local collocated or remote Symmetrix™ integrated cached disk arrays™ (a remote disk array may be a Symmetrix Remote Data Facility (SRDF)). User system 18a, 18b may comprise a host computer or a host computer network, which includes a database application.

Database application 20a, 20b retrieves and stores, in real time, data from and to a primary disk 26a, 26b. The data on primary disk 26a, 26b may be mirrored by a mirror disk 28a, 28b. Mirror disk 28a, 28b may comprise one or a combination of a RAID type of mirror and a mirror—such as a Business Continuance Volume (BCV). In the illustrated embodiment, mirror disk 28 comprises a volume which may be protected via a RAID mirror.

During a mirrored restore of data from a backup storage device to a primary disk, some systems will first read the data from the backup storage device and store it onto a mirror disk, and later copy the restored data from the mirror disk to the primary disk for use by the host system. Rather than first restore data to a mirror disk and later copy that data to the primary disk, the "pre-restored" data on the primary disk 26 is first copied to mirror disk 28 (see arrow "A" in FIGS. 1A and 1B), and, thereafter, the mirror is "split" (i.e., configured so it does not automatically update from the primary disk). The data is after restored from backup storage device 12 to primary disk 26, independent of mirror disk 28 (see arrow "B" in FIGS. 1A and 1B).

Note that the restore data flow reflected by arrow "B" in FIGS. 1A and 1B shows the ultimate, functional flow of data. In the example embodiment, such data flows through the data manager, which may comprise, e.g., a Sun™ microstation running EDM™ software (EMC data manager software). Alternatively, the enterprise storage system may be implemented so that the restore data does not pass through the data manager, but rather flows directly to the enterprise storage platform(s) housing the destination disk.

This method of performing a mirrored restore presents several advantages over the previous method. The restored data, once the restore operation is complete, is immediately available on the primary (host-system-accessed) disk 26. The restore can be easily reversed by simply copying the pre-restored data from mirror disk 28 to primary disk 26. Such a restore may be desirable when, for example: the data on the pre-restored primary (now on the mirror disk) is better than the restored data; there is a data restore failure; or the restore process is cancelled by a human operator. If the restore is cancelled by a human operator, the restore process may be configured to automatically reverse the restore by copying data from the mirror to the primary disk.

Figure 2:
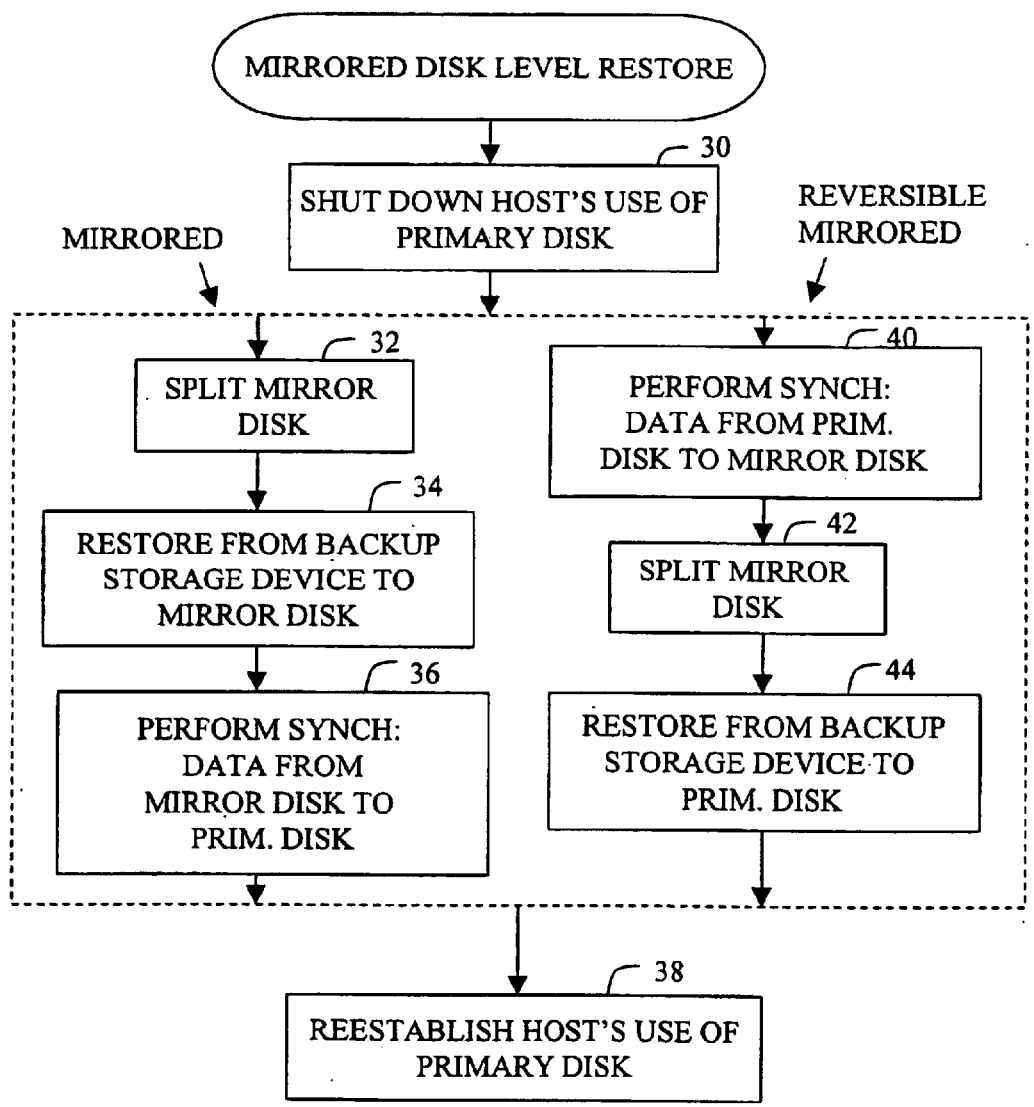
FIG. 2 is a flow chart of two compared approaches to performing a mirrored disk-level restore.

FIG. 2 is a flow chart of a mirror disk level restore process. At an initial act 30, the host's use of the primary disk is shut down. As a result, the user database application cannot perform database transactions—since the database is not running. Then, in act 32, the mirror disk is split. A split disconnects the link between the mirror disk and the primary disk, and makes the mirror disk available for use, e.g., by the data manager.

In act 34, the data (an "image" of the data on the disk as last backed up) is restored to the mirror disk. In act 36, a mirror restore is performed. That is, the data is read from the mirror disk to the primary disk. In act 38, the database is restarted, thereby reestablishing the host's use of the primary disk.

As noted above (referring to FIGS. 1A and 1B), rather than first restore data to a mirror disk and later move that data to the primary disk (see acts 32, 34, and 36), the "pre-restored" data on the primary disk is first copied to the mirror disk (see arrow "A" in FIGS. 1A and 1B), and thereafter, the data is restored from the backup storage device to the primary disk, independent of the mirror disk (see arrow "B" in FIGS. 1A and 1B). Accordingly, instead of acts 32, 34, and 36, the embodiment of FIG. 2 provides acts 40, 42, and 44.

In act 40, a primary disk to mirror disk synchronization is performed. This synchronization act, when performed by instantiated software, is one embodiment of a reflector that copies pre-restored data from the primary disk to the mirror disk in response to a restore request. Thereafter, in act 42, the mirror is split. In act 44, a restore is performed, where the backed-up disk "image" is read from the backup storage device to the primary disk. Act 44, when performed by instantiated software, is one embodiment of a primary disk restorer that restores data from the backup storage device to the primary disk, independent of the mirror disk. The process then proceeds to act 38, which act is described above.

FIG. 3 is a flow chart of a mirrored file-level restore process. In an initial act 50, the data manager tells the database application to preallocate space in the primary disk, and to give the data manager the map of the allocated space. Then, in act 52, the file system is unmounted. In act 54, the mirror is split. In act 56, the data files are restored from the backup storage device to the mirror. In act 58, a mirror disk to primary disk synchronization is performed, i.e., the data on the primary disk is synchronized so that it is equal to the mirror disk. In act 60, the file system is mounted.

As noted above (referring to FIGS. 1A and 1B), rather than first restore data to a mirror disk and later move that data to the primary disk (see acts 56 and 58), the "pre-restored" data on the primary disk is first copied to the mirror disk (see arrow "A" in FIGS. 1A and 1B), and thereafter, the data is restored from the backup storage device to the primary disk, independent of the mirror disk (see arrow "B" in FIGS. 1A and 1B). Accordingly, instead of acts 56 and 58, the embodiment of FIG. 3 provides acts 70 and 78.

In act 70, a primary disk to mirror disk synchronization is performed. This act, when performed by instantiated software, is one embodiment of a reflector. Data is copied from the primary disk to the mirror disk. Thereafter, in act 72, the mirror is split. In act 74, the data manager tells the database application to preallocate space in the primary disk, and to give the data manager the map of the allocated space. Then, in act 76, the file system is unmounted. In act 78, a restore is performed, where the backed-up disk files are read from the backup storage device to the primary disk. This act, when instantiated software, is one embodiment of a primary disk restorer. The process then proceeds to act 60, which act is described above.

Figure 4B:
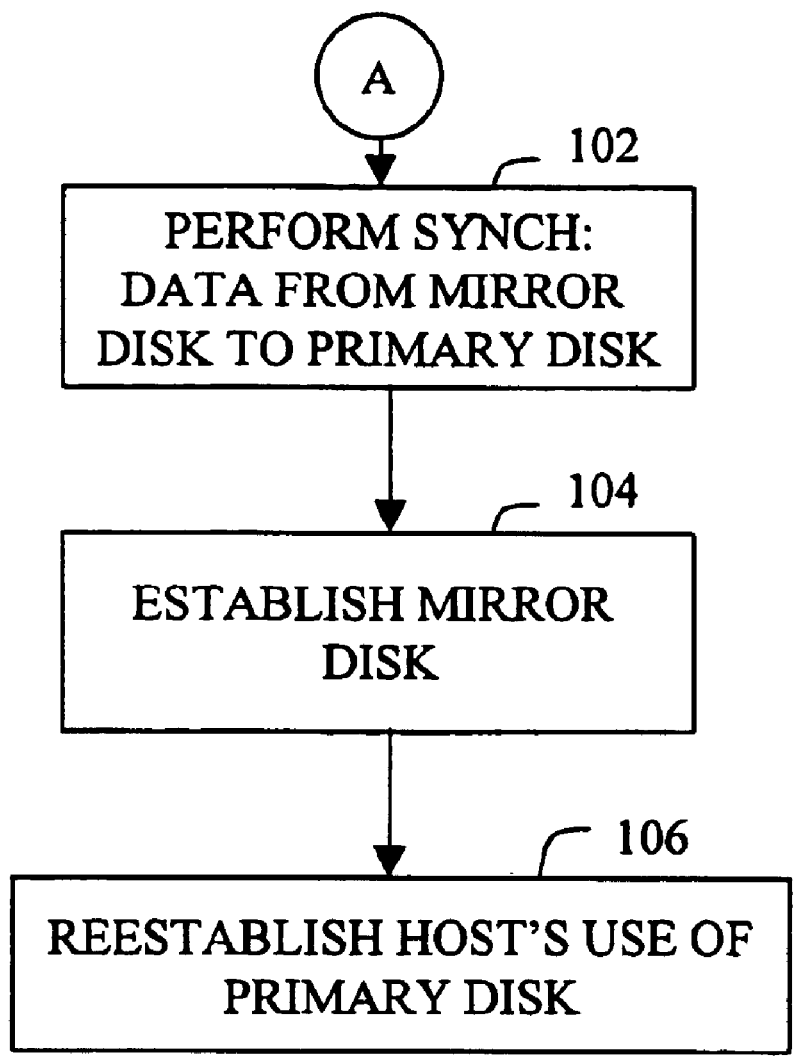

FIGS. 4A and 4B show a flow chart of a reversible mirror restore process, including acts involving cancellation and reversing of a restore operation. In an act 90, a synchronization is performed from the primary disk to the mirror disk. Such synchronization may comprise a synchronization performed as part of an establishment of the mirror, or a synchronization on-demand for purposes of the restore operation. In act 92, the mirror is split. A split requires that the mirror be first a duplicate of the primary disk, before the connection between the two disks is separated. The split allows devices to write to and read from each of the disks, independent of the other disk.

At act 94, if the restore is a file level restore, certain acts are performed. Specifically, acts corresponding to acts 74 and 76 of FIG. 3 are performed at this point.

At act 96, the data is restored from the backup storage device to the primary disk, independent of the mirror disk.

During act 96 and up until the restore becomes irreversible for some reason, one of a number of "cancellation" conditions may be met. Such irreversibility may occur if, e.g., after the restore, the mirror disk, with the pre-restore primary disk data, is written over by re-establishing the mirror disk so that it contains an identical copy of the primary disk.

The cancellation conditions are illustrated by decision blocks 97, 98, and 99. Per decision block 97, when a user cancels the restore, the process proceeds to act 102 (see FIG. 4B), at which point reversal acts 102, 104, and 106 are performed. The same occurs when there is a failure during restore (per decision block 98), and when there is an integrity problem with the restore data (per decision block 99).

At act 102, the data synchronized from the mirror disk to the primary disk, effectively reversing the restore by returning the "pre-restore" data to the primary disk. At act 104, the mirror is established, which causes the primary disk to be linked to the mirror disk, so that the mirror image (on the mirror disk) of the primary disk is automatically maintained. At act 106, the host's use of the primary disk is reestablished.

The processing performed by, e.g., the data manager, the enterprise storage platform, the user system, and the database application, may be performed by individual or shared general purpose computers or in connection with specialized processing computers. Such processing may be performed by individual platforms or by distributed processing platforms. In addition, such processing and functionality can be implemented in the form of special purpose hardware or in the form of software being run by a general purpose computer. Any data handled in such processing or created as a result of such processing can be stored in any memory as is conventional in the art. By way of example, such data may be stored in a temporary memory, such as in the RAM of a given computer system or subsystem. In addition, or in the alternative, such data may be stored in longer-term storage devices, for example, magnetic disks, rewritable optical disks, and so on. For purposes of the disclosure herein, a computer-readable media may comprise any form of data storage mechanism, including such existing memory technologies as well as hardware or circuit representations of such structures and of such data.

While the invention has been described with reference to certain illustrated embodiments, the words which have been used herein are words of description, rather than words of limitation. Changes may be made, within the purview of the appended claims, without departing from the scope and spirit of the invention in its aspects. Although the invention has been described herein with reference to particular structures, acts, and materials, the invention is not to be limited to the particulars disclosed, but rather extends to all equivalent structures, acts, and materials, such as are within the scope of the appended claims.

What is claimed is:

1. A system for restoring data from backup storage using a mirror disk and a primary disk, the restored data being restored to the primary disk which is accessible by a database application in a host system, the system comprising:
   a reflector to copy pre-restored data from the primary disk to the mirror disk in response to a restore request; and
   a primary disk restorer to restore data from a backup storage device to the primary disk, independent of the mirror disk, after the pre-restored data is copied from the primary disk to the mirror disk.

2. The system according to claim 1, wherein the restore comprises a disk-level restore of a complete image of a given disk.

3. The system according to claim 1, wherein the restore comprises a file-level restore of selected files needed by the database application.

4. The system according to claim 1, wherein the reflector comprises instantiated software for performing a primary disk to mirror disk synchronization.

5. A method for restoring data from backup storage using a mirror disk and a primary disk, the restored data being restored to the primary disk which is accessible by a database application in a host system, the method comprising:
   copying pre-restored data from the primary disk to the mirror disk in response to a restore request; and
   restoring data from a backup storage device to the primary disk, independent of the mirror disk, after the pre-restored data is copied from the primary disk to the mirror disk.

6. The method according to claim 5, wherein the restoring comprises performing a disk-level restore of a complete image of a given disk.

7. The method according to claim 5, wherein the restoring comprises performing a file-level restore of select files needed by the database application.

8. The method according to claim 5, wherein the copying comprises performing a primary disk to mirror disk synchronization.

9. A computer-readable medium encoded with a program for restoring data from backup storage using a mirror disk and a primary disk, the restored data being restored to said primary disk which is accessible by a database application in a host system, said program when read by a computer causing:
   copying pre-restored data from the primary disk to the mirror disk in response to a restore request; and
   restoring data from a backup storage device to the primary disk, independent of the mirror disk, after the pre-restored data is copied from the primary disk to the mirror disk.

10. The medium according to claim 9, wherein the restoring comprises performing a disk-level restore of a complete image of a given disk.

11. The medium according to claim 9, wherein the restoring comprises performing a file-level restore of select files needed by the database application.

12. The medium according to claim 9, wherein the copying comprises performing a primary disk to mirror disk synchronization.

13. A method comprising:
- a restore system performing a restore operation, the restore operation including restoring data from a source to a restore target;
- the restore system reversing the restore operation in response to a request to cancel the restore operation, the reversing of the restore operation leaving the restore target, after the reversing, in a data state the same as the data state of the restore target prior to the restore operation.

14. The method according to claim 13, wherein the interaction with the restore system comprises a user cancel request.

15. The method according to claim 13, wherein the interaction with the restore system comprises a cancel request caused by a problem with the integrity of the data being restored.

16. The method according to claim 13, wherein the interaction with the restore system comprises a cancel request caused by a detected failure of the restore operation.

17. The method according to claim 13, wherein the restore system comprises a data manage and an enterprise storage platform.

18. The method according to claim 17, wherein the source comprises a backup storage device.

19. The method according to claim 18, wherein the backup storage device comprises a tape unit.

20. The method according to claim 18, wherein the restore target comprises a primary disk.

21. The method according to claim 13, further comprising, before attempting a restore, moving data from the restore target to a holding location.

22. The method according to claim 21, wherein said holding location comprises a mirror disk.

* * * * *

UNITED STATES PATENT AND TRADEMARK OFFICE
CERTIFICATE OF CORRECTION

PATENT NO.    : 6,832,330 B1
DATED         : December 14, 2004
INVENTOR(S)   : Robert A. Boudrie et al.

It is certified that error appears in the above-identified patent and that said Letters Patent is hereby corrected as shown below:

Column 3,
Line 23, delete "local collocated" and replace with -- local/collocated --.

Signed and Sealed this

Twenty-fourth Day of May, 2005

JON W. DUDAS
*Director of the United States Patent and Trademark Office*